US010562523B2

(12) United States Patent
Ienaga et al.

(10) Patent No.: US 10,562,523 B2
(45) Date of Patent: Feb. 18, 2020

(54) VEHICLE CONTROL APPARATUS AND VEHICLE CONTROL METHOD

(71) Applicant: SUBARU CORPORATION, Tokyo (JP)

(72) Inventors: Hiroshi Ienaga, Tokyo (JP); Kentaro Ishii, Tokyo (JP); Akihito Katsume, Tokyo (JP); Fumiyuki Moriya, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 0 days.

(21) Appl. No.: 16/172,415

(22) Filed: Oct. 26, 2018

(65) Prior Publication Data

US 2019/0168744 A1  Jun. 6, 2019

(30) Foreign Application Priority Data

Dec. 1, 2017  (JP) .................................. 2017-231785

(51) Int. Cl.
  *B60W 30/02*  (2012.01)
  *B60W 10/12*  (2012.01)
  (Continued)

(52) U.S. Cl.
  CPC .............. *B60W 30/02* (2013.01); *B60K 1/02* (2013.01); *B60W 10/08* (2013.01); *B60W 10/12* (2013.01);
  (Continued)

(58) Field of Classification Search
  CPC ...... B60W 30/02; B60W 10/08; B60W 10/12; B60W 2510/087
  See application file for complete search history.

(56) References Cited

U.S. PATENT DOCUMENTS

| 7,739,005 B1* | 6/2010 | Tang | ......................... B60L 3/10 701/22 |
| 2004/0040758 A1* | 3/2004 | Shimizu | ................... B60K 6/44 180/65.225 |

(Continued)

FOREIGN PATENT DOCUMENTS

| JP | 2005-312187 A | 11/2005 |
| JP | 2007-276674 A | 10/2007 |

(Continued)

OTHER PUBLICATIONS

Japanese Office Action, dated Oct. 15, 2019, in Japanese Application No. 2017-231785 and English Translation thereof.

*Primary Examiner* — Edwin A Young
(74) *Attorney, Agent, or Firm* — McGinn IP Law Group, PLLC (57) ABSTRACT

A vehicle control apparatus includes a thermal load priority calculator, a stability priority calculator, and a driving force distribution controller. The thermal load priority calculator is configured to calculate a thermal load priority that prioritizes a thermal load of a motor for driving a vehicle according to an operating state of the vehicle. The stability priority calculator is configured to calculate a stability priority that prioritizes a stability of the vehicle according to an operating state of the vehicle. The driving force distribution controller is configured to control a driving force distribution in a front and a rear of the vehicle, on a basis of a result of comparing the thermal load priority and the stability priority.

14 Claims, 7 Drawing Sheets

(51) Int. Cl.
    *B60W 10/08*     (2006.01)
    *B60K 1/02*     (2006.01)
    *B60K 23/08*     (2006.01)
    *B60K 17/354*     (2006.01)
    *B60K 26/04*     (2006.01)

(52) U.S. Cl.
    CPC ............ *B60K 17/354* (2013.01); *B60K 23/08* (2013.01); *B60K 2026/046* (2013.01); *B60W 2400/00* (2013.01); *B60W 2420/42* (2013.01); *B60W 2510/087* (2013.01); *B60W 2520/10* (2013.01); *B60W 2520/105* (2013.01); *B60W 2520/125* (2013.01); *B60W 2520/26* (2013.01); *B60W 2550/14* (2013.01); *B60W 2710/12* (2013.01)

(56) References Cited

U.S. PATENT DOCUMENTS

| | | | |
|---|---|---|---|
| 2010/0241304 A1* | 9/2010 | Maeda | ..................... B60K 6/52 |
| | | | 701/31.4 |
| 2012/0101675 A1 | 4/2012 | Saito | |
| 2014/0343816 A1 | 11/2014 | Onoda et al. | |
| 2016/0280201 A1* | 9/2016 | Choi | ..................... B60W 20/00 |

FOREIGN PATENT DOCUMENTS

| | | |
|---|---|---|
| JP | 2012-095378 A | 5/2012 |
| JP | WO2013/069092 A1 | 4/2015 |
| JP | 2015-220802 A | 12/2015 |

* cited by examiner

VEHICLE CONTROL APPARATUS AND VEHICLE CONTROL METHOD

CROSS-REFERENCE TO RELATED APPLICATIONS

The present application claims priority from Japanese Patent Application No. 2017-231785 filed on Dec. 1, 2017, the entire contents of which are hereby incorporated by reference.

BACKGROUND

1. Technical Field

The present invention relates to a vehicle control apparatus and a vehicle control method.

2. Related Art

In the related art, WO 2013/069092 describes increasing the degree to which the driving force or braking force of the wheels is adjusted to a distribution according to the balance of thermal margins in in-wheel motors in the case of low vehicle speed compared to the case of high vehicle speed.

SUMMARY OF THE INVENTION

An aspect of the present invention provides a vehicle control apparatus including: a thermal load priority calculator configured to calculate a thermal load priority that prioritizes a thermal load of a motor for driving a vehicle according to an operating state of the vehicle; a stability priority calculator configured to calculate a stability priority that prioritizes a stability of the vehicle according to an operating state of the vehicle; and a driving force distribution controller configured to control a driving force distribution in a front and a rear of the vehicle, on a basis of a result of comparing the thermal load priority and the stability priority.

An aspect of the present invention provides a vehicle control method including: calculating a thermal load priority that prioritizes a thermal load of a motor for driving a vehicle according to an operating state of the vehicle; calculating a stability priority that prioritizes a stability of the vehicle according to an operating state of the vehicle; and controlling a driving force distribution in a front and a rear of the vehicle, on a basis of a result of comparing the thermal load priority and the stability priority.

An aspect of the present invention provides circuitry configured to calculate a thermal load priority that prioritizes a thermal load of a motor for driving a vehicle according to an operating state of the vehicle, calculate a stability priority that prioritizes a stability of the vehicle according to an operating state of the vehicle, and control a driving force distribution in a front and a rear of the vehicle, on a basis of a result of comparing the thermal load priority and the stability priority.

DETAILED DESCRIPTION

Hereinafter, preferred examples of the present invention will be described in detail with reference to the appended drawings. Note that, in this specification and the appended drawings, structural elements that have substantially the same function and structure are denoted with the same reference numerals, and repeated description of these structural elements is omitted.

With the technology described in WO 2013/069092 above, in the low-speed domain, the driving force distribution is adjusted according to the balance of thermal margins in the motors, but since the adjustment prioritizes the thermal load, vehicle stability is not taken into account, and there is a problem in that vehicle behavior readily becomes unstable.

It is desirable to provide a novel and improved vehicle control apparatus and vehicle control method capable of optimally adjusting a control that prioritizes the thermal load and a control that prioritizes stability when distributing the driving force of the vehicle.

Figure 1:
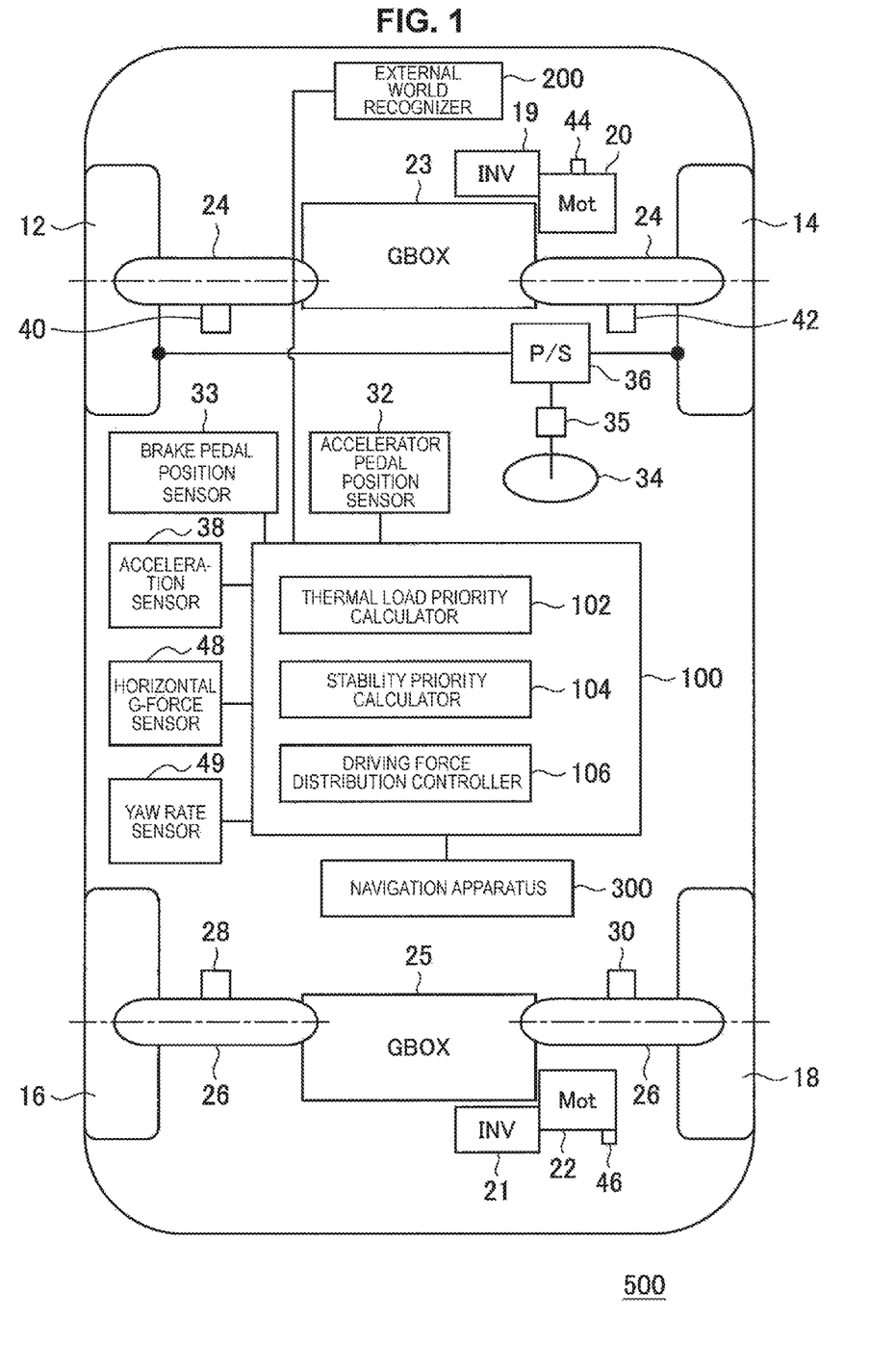
FIG. 1 is a schematic diagram illustrating a configuration of a vehicle according to an example of the present invention.

First, FIG. 1 will be referenced to describe a configuration of a vehicle 500 according to an example of the present invention. FIG. 1 is a schematic diagram illustrating a configuration of the vehicle 500 according to the example of the present invention. As illustrated in FIG. 1, the vehicle 500 includes four tires (wheels) 12, 14, 16, 18 in the front and the rear, a controller 100, an external world recognizer 200, a motor 20 that controls the rotation of the front tires 12 and 14, a motor 22 that controls the rotation of the rear tires 16 and 18, an inverter 19 that executes control of the motor 20, an inverter 21 that executes control of the motor 22, a gearbox 23 and a drive shaft 24 that transmit the driving force of the motor 20 to the tires 12 and 14, a gearbox 25 and a drive shaft 26 that transmits the driving force of the motor 22 to the tires 16 and 18, wheel speed sensors 40 and 42 that detect the wheel speed (vehicle speed) from the rotation of each of the front tires 12 and 14, wheel speed sensors 28 and 30 that detect the wheel speed (vehicle speed) from the rotation of each of the rear tires 16 and 18, an accelerator pedal position sensor 32, a brake pedal position sensor 33, a steering wheel 34 that steers the front wheels 12 and 14, a steering angle sensor 35 that detects a steering angle δ of the steering wheel, a power steering mechanism 36, an acceleration sensor 38 that detects acceleration in the forward-reverse direction of the vehicle, a horizontal G-force sensor 48 that detects acceleration in the horizontal direction of the vehicle, and a yaw rate sensor 49.

Also, the vehicle 500 is provided with a navigation apparatus 300. Also, temperature sensors 44 and 46 that detect the temperature of each motor 20 and 22 are installed in the front-wheel motor 20 and the rear-wheel motor 22, respectively.

Note that in the configuration illustrated in FIG. 1, a single motor 20 that drives the front wheels and a single motor 22 that drives the rear wheels are provided, but the configuration is not limited thereto, and motors that drive each of the four wheels and gearboxes corresponding to each of the motors may also be provided.

In the example, the controller 100 computes braking/driving force of the motors 20 and 22, issues instructions regarding the braking/driving force to the motors 20 and 22, and thereby cooperatively controls the motors 20 and 22.

Figure 2:
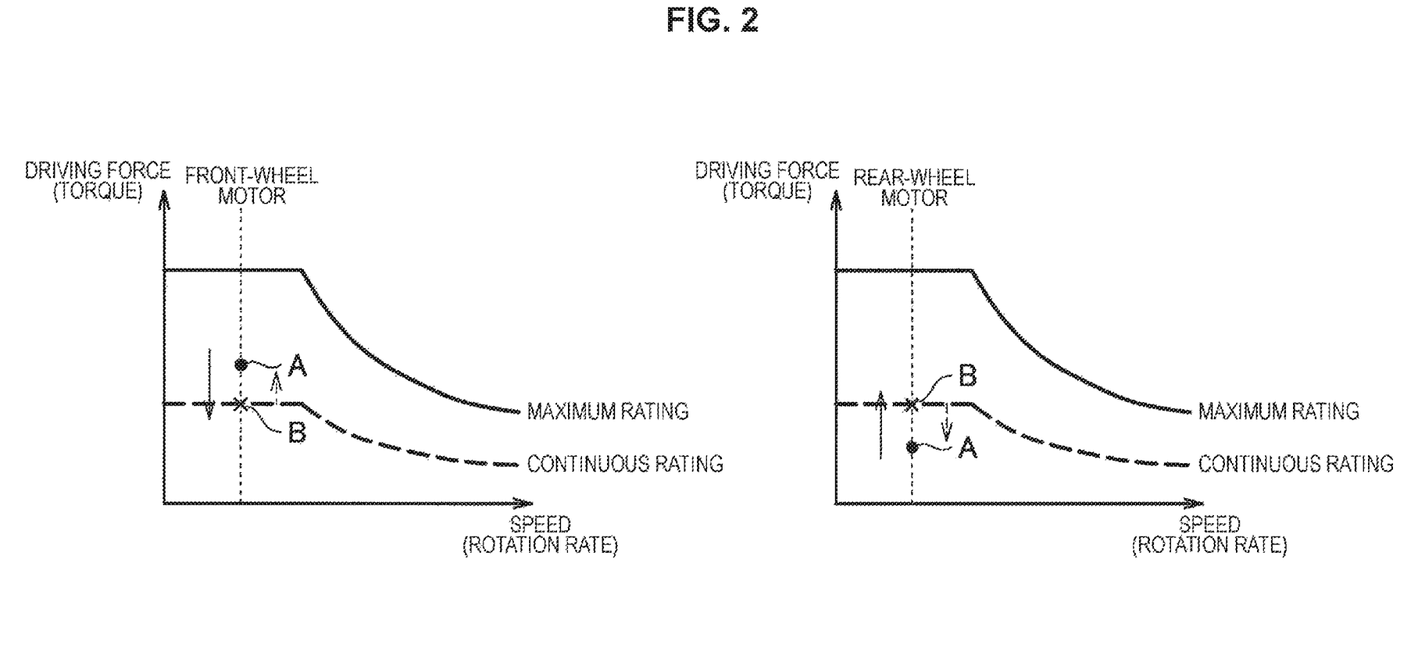
FIG. 2 is a schematic diagram illustrating an overview of a motor control method according to the example.

FIG. 2 is a schematic diagram illustrating an overview of a control method of the motors 20 and 22 according to the example. FIG. 2 illustrates the relationship between the driving force (torque) and speed (rotation rate) for each of the front-wheel motor 20 and the rear-wheel motor 22.

Note that the running modes of the motors 20 and 22 include a maximum rating mode and a continuous rating mode. In the maximum rating mode, the maximum torque value that the motor is able to exhibit may be output, but the duration of the maximum torque value is limited. If the motor is used in the maximum rating mode, since the amount of internally generated heat rises sharply and influences motor degradation and the like, a duration (allowed time) of the maximum torque value in the maximum rating mode is decided. On the other hand, in the continuous rating mode, although the torque value is more limited than in the maximum rating mode, a torque value that may be output continuously over a long period of time is set as the upper limit. In FIG. 2, the torque characteristics for each of the maximum rating mode and the continuous rating mode are illustrated.

In the example, since each of the motors 20 and 22 may be controlled independently, by optimally controlling the front-rear distribution of torque in the front-wheel motor 20 and the rear-wheel motor 22, the stability of the vehicle 500 may be increased. Particularly, in the example, a vehicle state is estimated from various travel information, and in the case in which the thermal load on the motors 20 and 22 is predicted to increase, a front-rear driving force distribution that prioritizes the thermal load is performed. Also, when performing the front-rear driving force distribution that prioritizes the thermal load, in the case in which the behavior of the vehicle 500 becomes unstable, or in the case in which the behavior of the vehicle 500 is likely to become unstable, the distribution is switched to a front-rear distribution that prioritizes stability.

In addition, the threshold when switching to the front-rear distribution that prioritizes safety may also be changed according to the thermal margin of each of the motors 20 and 22. Specifically, in the case in which the motors 20 and 22 are in an operating state that generates heat readily, and there is no thermal margin, since it is difficult to switch to a front-rear distribution that prioritizes stability, the threshold value is changed.

On the basis of FIG. 2, a case of switching from the state of traveling with a front-rear distribution that prioritizes stability to a distribution that prioritizes the thermal load, and additionally switching to a front-rear distribution that prioritizes stability, will be described. As an assumption, it is presupposed that in the vehicle 500, the load on the front wheels is greater than the load on the rear wheels in a still state, and by increasing the driving force of the front wheels above that of the rear wheels, the behavior during travel of the vehicle 500 becomes more stable.

First, in the case in which the motors 20 and 22 are not particularly generating heat, to prioritize the stability of the vehicle 500, the front-wheel motor 20 and the rear-wheel motor 22 are driven by the torque and rotation rate illustrated by the point A in FIG. 2. With this arrangement, the driving force distribution of the front wheels becomes higher than the rear wheels, and the vehicle may be made to travel stably.

Next, in an operating state in which the front-wheel motor 20 possibly may generate heat, there is a possibility that the driving force of the front-wheel motor 20 will be limited. Specifically, in an operating state in which the front-wheel motor 20 possibly may generate heat, there is a possibility of being unable to drive the front-wheel motor 20 at a torque that exceeds the continuous rating mode. For this reason, before the front-wheel motor 20 generates heat, the torque of the front-wheel motor 20 is reduced in advance. The torque reduction of the front-wheel motor 20 is illustrated by the solid arrow in FIG. 2. As a result of the torque reduction, the front-wheel motor 20 is driven by the torque and rotation rate illustrated by the point B in FIG. 2. With this arrangement, since the front-wheel motor 20 is driven in the neighborhood of the torque of the continuous rating mode, heat generation may be suppressed.

Additionally, to minimize a drop in the total driving force of the vehicle 500 due to the torque reduction in the front-wheel motor 20, the torque of the rear-wheel motor 22 is increased. The torque increase of the rear-wheel motor 22 is illustrated by the solid arrow in FIG. 2. As a result of the torque increase, the rear-wheel motor 22 is driven by the torque and rotation rate illustrated by the point B in FIG. 2. With this arrangement, a drop in the total driving force of the vehicle 500 may be minimized. By the above, the driving force distribution between the front wheels and the rear wheels becomes approximately 1:1. By lowering the torque of the front-wheel motor 20, the generation of heat in the front-wheel motor 20 may be suppressed, and control of the motors 20 and 22 that prioritizes the thermal load may be executed.

Next, in the case in which the vehicle behavior becomes unstable in a state of a nearly uniform front-rear torque distribution, the front-wheel motor 20 and the rear-wheel motor 22 are driven again by the torques and rotation rates illustrated by the point A in FIG. 2. Specifically, the torque of the front-wheel motor 20 is increased as illustrated by the dashed arrow in FIG. 2. Also, the torque of the front-wheel motor 22 is increased, as illustrated by the dashed arrow in FIG. 2. With this arrangement, since the driving force of the front-wheel motor 20 becomes larger compared to the rear-wheel motor 22, it becomes possible to stabilize the vehicle behavior.

Note that in the above description, the vehicle 500 is assumed to have characteristics whereby increasing the driving force of the front wheels above that of the rear wheels causes the behavior during travel of the vehicle 500 to become more stable. On the other hand, in the case in which the vehicle 500 has characteristics whereby increasing the driving force of the rear wheels above that of the front wheels induces stability, it is sufficient to execute a control that is the opposite of the control described above with respect to the front-wheel motor 20 and the rear-wheel motor 22.

In the example as above, in the case in which the thermal load on the motors 20 and 22 is predicted to increase, by performing a front-rear driving force distribution that prioritizes the thermal load in advance, in the case in which a state of vehicle behavior becoming unstable, such as a slip, occurs later, the distribution may be switched to a torque distribution that prioritizes stability.

Consequently, in a situation where it is desirable to ensure stability with the driving force distribution, such as the case in which a slip occurs, since a driving force constraint is not being imposed on the front-wheel motor 20, the target driving force distribution becomes possible, and it becomes possible stabilize the vehicle behavior.

Figure 3:
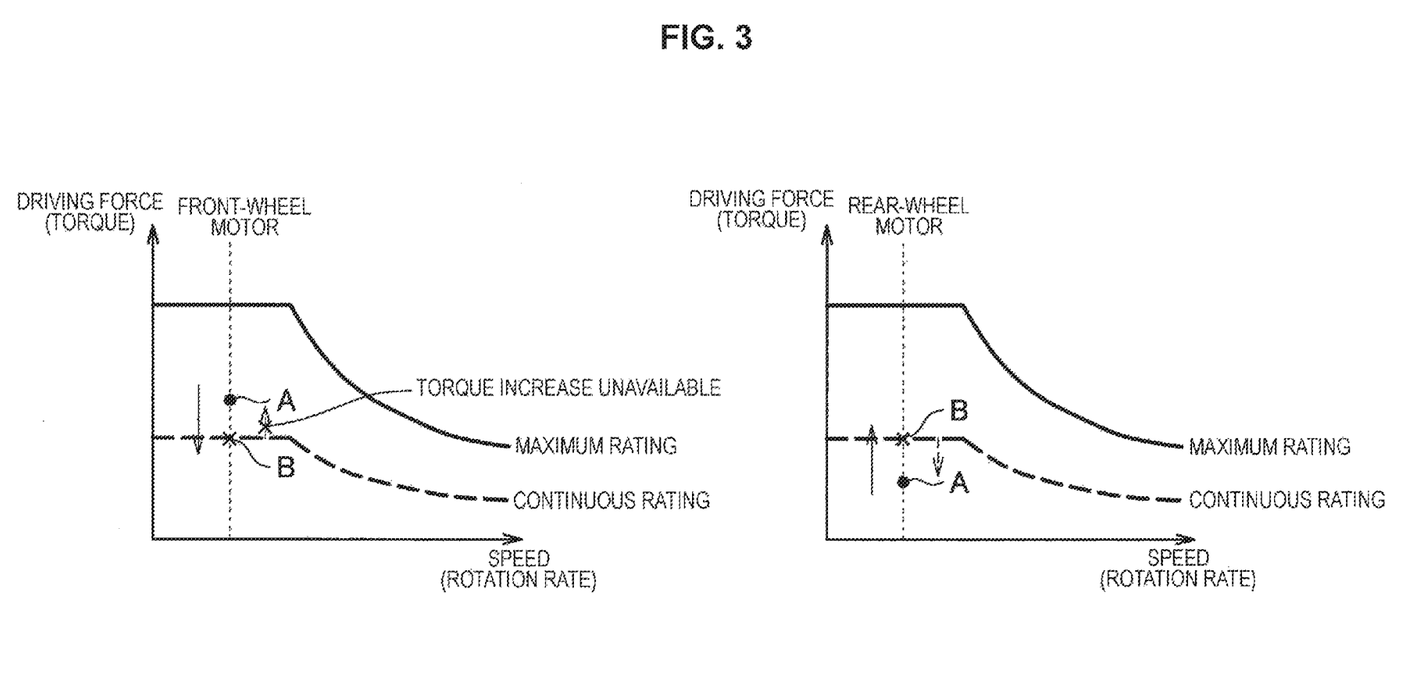
FIG. 3 is a schematic diagram illustrating an instance of limiting the driving force of a front-wheel motor as a result of the front-wheel motor actually generating heat, as a comparison to the control of the example illustrated in FIG. 2.

FIG. 3 is a schematic diagram illustrating an instance of limiting the driving force of the front-wheel motor 20 as a result of the front-wheel motor 20 actually generating heat, as a comparison to the control of the example illustrated in FIG. 2.

First, similarly to FIG. 2, in the case in which the motors 20 and 22 are not particularly generating heat, to prioritize the stability of the vehicle 500, the front-wheel motor 20 and the rear-wheel motor 22 are driven by the torque and rotation rate illustrated by the point A in FIG. 3. With this arrangement, the driving force distribution of the front wheels becomes higher than the rear wheels, and the vehicle may be made to travel stably.

Next, in the case in which the front-wheel motor 20 generates heat that necessitates operation in the continuous rating mode, a torque reduction of the front-wheel motor 20 is executed, and the front-wheel motor 20 is driven by the torque and rotation rate illustrated by the point B in FIG. 3. The torque reduction of the front-wheel motor 20 is illustrated by the solid arrow in FIG. 3. With this arrangement, since the front-wheel motor 20 is driven in the neighborhood of the torque of the continuous rating mode, heat generation may be suppressed.

Additionally, to minimize a drop in the total driving force of the vehicle 500 due to the torque reduction in the front-wheel motor 20, the torque of the rear-wheel motor 22 is increased, and the rear-wheel motor 22 is driven by the torque and rotation rate illustrated by the point B in FIG. 3. The torque increase of the rear-wheel motor 22 is illustrated by the solid arrow in FIG. 3. With this arrangement, a drop in the total driving force of the vehicle 500 may be minimized. By the above, the driving force distribution between the front wheels and the rear wheels becomes approximately 1:1.

Next, suppose that the vehicle behavior becomes unstable while in a state of a nearly uniform front-rear torque distribution. For instance, in the case in which the rear wheels slip, the slip is avoided by reducing the torque of the rear-wheel motor 22 as illustrated by the dashed arrow. At this time, even if one attempts to minimize the drop in the total driving force of the vehicle 500 due to the torque reduction of the rear-wheel motor 22 by increasing the torque of the front-wheel motor 20, the driving force of the front-wheel motor 20 is limited to a torque in the continuous rating mode due to heat generation. For this reason, a torque increase of the front-wheel motor 20 is unavailable.

Consequently, in the control of the comparative example illustrated in FIG. 3, if a driving force constraint due to thermal load is imposed on the motors 20 and 22, the drop in the total driving force of the vehicle cannot be minimized, and driving force control for stabilizing the vehicle behavior can no longer be executed reliably.

As above, in the comparative example illustrated in FIG. 3, although it is possible to travel while taking stability into account while in a state of prioritizing stability (and while transitioning to such a state) such as when a slip occurs, since stability is not taken into account in the domain where the thermal load is prioritized, there is a problem in that the vehicle behavior easily becomes unstable.

On the other hand, in the process of the example illustrated in FIG. 2, it is determined whether there is a possibility of heat generation by the motors 20 and 22 in advance, and if there is a possibility of heat generation, the front-rear driving force distribution is switched to a distribution that prioritizes the thermal load in advance. Subsequently, the front-rear driving force distribution is switched to a distribution that prioritizes stability only in the case in which a front-rear driving force distribution that prioritizes stability is particularly necessary. With this arrangement, in the case in which the vehicle behavior becomes unstable after switching to a front-rear driving force distribution that prioritizes the thermal load, it becomes possible to switch to a front-rear driving force distribution that prioritizes the stability of the vehicle. Consequently, it is possible to stabilize the vehicle behavior reliably. Particularly, in a situation where uneven heat generation in the front and rear motors is a concern, by performing a driving force distribution to minimize heat generation in advance, an actual limiting of driving force as in FIG. 3 may be avoided. With this arrangement, since a limitation does not occur in a situation where an increase in driving force is necessary, particularly in a situation where it is desirable to control the driving force distribution, it becomes possible to provide a safer vehicle 500.

Figure 4:
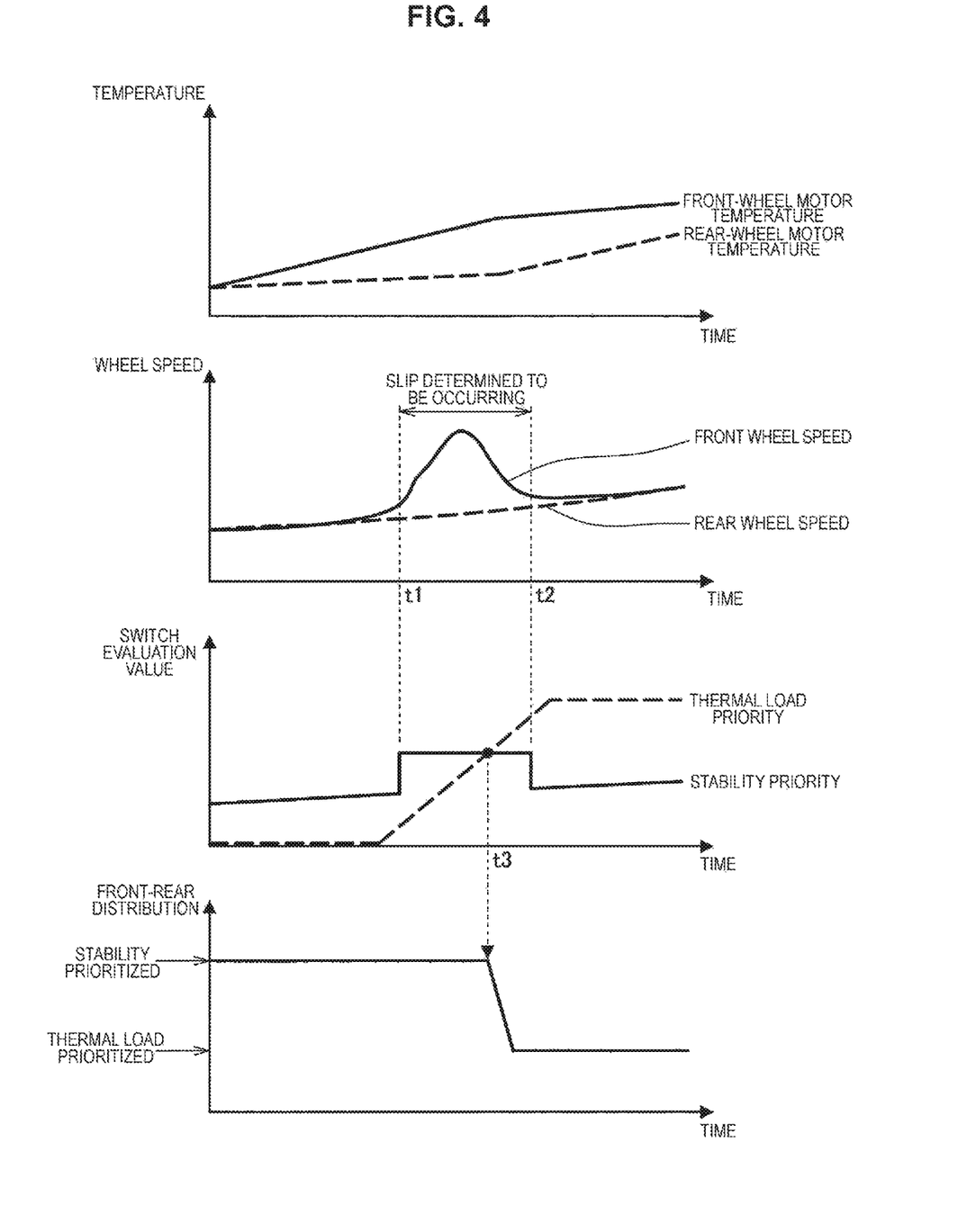
FIG. 4 is a characteristic diagram illustrating how each of temperatures of a front-wheel motor and a rear-wheel motor, wheel speeds of front wheels and rear wheels, evaluation values of thermal load priority and stability priority, and a driving force distribution to the front wheels and the rear wheels changes over time.

Hereinafter, a specific control method will be described. FIG. 4 is a characteristic diagram illustrating how each of temperatures of the front-wheel motor 20 and the rear-wheel motor 22, wheel speeds of the front wheels and the rear wheels, evaluation values of the thermal load priority and the stability priority, and the driving force distribution to the front wheels and the rear wheels changes over time.

The temperatures of each of the front-wheel motor 20 and the rear-wheel motor 22 illustrated in FIG. 4 are detected by the temperature sensors 44 and 46 installed in the motors 20 and 22. As illustrated in FIG. 4, as the operation of the vehicle 500 continues, the temperature of each of the front-wheel motor 20 and the rear-wheel motor 22 rises over time. Similarly to FIG. 2, it is assumed that in the vehicle 500, the load on the front wheels is greater than the load on the rear wheels in a still state, and by increasing the driving force of the front wheels above that of the rear wheels, the behavior during travel of the vehicle 500 becomes more stable. Also, assume that in the initial phase of the operation of the vehicle 500, to perform operation that prioritizes the stability of the vehicle 500 is performed, the driving force of the front wheels is increased above that of the rear wheels. With this arrangement, as illustrated in FIG. 4, the temperature rises faster in the front-wheel motor 20 than the rear-wheel motor 22.

The wheel speeds of the front wheels illustrated in FIG. 4 are detected by the wheel speed sensors 40 and 42. Also, the wheel speeds of the rear wheels are detected by the wheel speed sensors 28 and 30. In the instance illustrated in FIG. 4, the vehicle speed is rising over time, and the wheel speeds of the front wheels and the rear wheels are rising. Note that a wheel speed of the front wheels may also be computed by averaging the detection values of each of the wheel speed sensors 40 and 42. Similarly, a wheel speed of the rear wheels may also be computed by averaging the detection values of each of the wheel speed sensors 28 and 30.

Also, in the instance illustrated in FIG. 4, the wheel speed of the front wheels rises greatly between the time t1 and the time t2, demonstrating that a slip of the front wheels is occurring. In the case in which the wheel speed is rising sharply as in FIG. 4, a determination (slip determination) indicating that a slip is occurring is made. The slip determination may be made on the basis of the detection values from the wheel speed sensors 28, 30 and the wheel speed sensors 40, 42. In the case in which a slip is not occurring, if the vehicle is traveling on a straight path, the detection values from the wheel speed sensors 28, 30 and the wheel speed sensors 40 and 42 become the same, whereas if the vehicle is traveling on a curved path, a difference occurs in the wheel speeds of the left and right wheels caused by the turning radius differential. Consequently, in the case in which, while traveling on a straight path, the wheel speed of a specific wheel is greater than the wheel speeds of the other wheels, it may be determined that the specific wheel is slipping. Similarly, in the case in which, while traveling on a curved path, the wheel speed of a specific wheel is greater than the wheel speeds of the other wheels, even when the turning radius differential is taken into account, it may be determined that the specific wheel is slipping.

The switch evaluation values include a thermal load priority and a stability priority. The thermal load priority is an evaluation value (indicator) when controlling the motors 20 and 22 while prioritizing the thermal load, and changes depending on the thermal load on the motors 20 and 22. For instance, the higher the temperature of the motors 20 and 22 detected from the temperature sensors 44 and 46, the greater the value of the thermal load priority.

Figure 5:
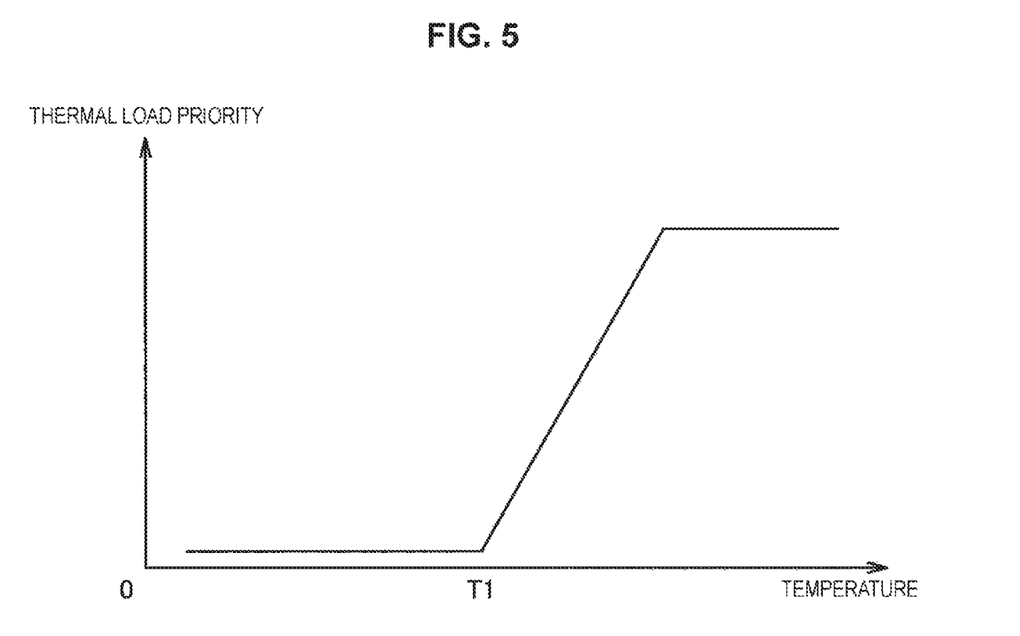
FIG. 5 is a schematic diagram illustrating the relationship between a motor temperature (horizontal axis) detected from a temperature sensor and a thermal load priority (vertical axis)

As one instance, FIG. 5 is a schematic diagram illustrating the relationship between the temperature (horizontal axis) of the motors 20 and 22 detected from the temperature sensors 44 and 46, and the thermal load priority (vertical axis). As illustrated in FIG. 5, if the temperature of the motors 20 and 22 is a predetermined value T1 or less, the value of the thermal load priority is a value close to 0. If the temperature of the motors 20 and 22 exceeds the predetermined value T1, the value of the thermal load priority increases in association with the rise in temperature. In addition, the thermal load priority may also be determined from the temperatures of the inverters 19 and 21 instead of the temperatures of the motors 20 and 22.

In addition, the thermal load priority may be estimated from another parameter that indicates the thermal load on the motors 20 and 22. Specifically, the thermal load priority may be estimated from the load on the motors 20 and 22, information about the outside of the vehicle obtained from the external world recognizer 200, external information obtained from the navigation apparatus 300, or the like.

The load on the motors 20 and 22 may be computed from the current and voltage values of the motors 20 and 22, or the integrated values of the output of the motors 20 and 22. For instance, the greater the power consumption computed from the current and voltage values, the greater the load on the motors 20 and 22. Also, the load on the motors 20 and 22 may be computed from the output of the motors 20 and 22, that is, the torque and rotation rate. For instance, the greater the integrated values of the output of the motors 20 and 22 computed from the torque and rotation rate, the greater the load on the motors 20 and 22.

Figure 6:
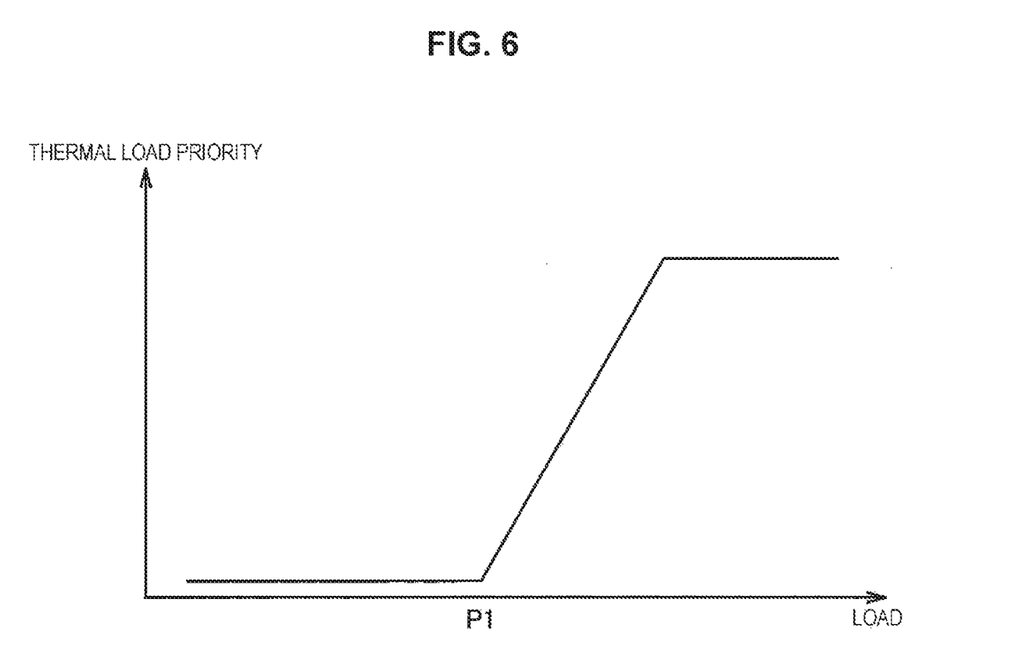
FIG. 6 is a schematic diagram illustrating a map prescribing the relationship between a motor load (horizontal axis) and a thermal load priority (vertical axis)

The thermal load priority may be computed from a map that prescribes a relationship between the load on the motors 20 and 22 and the thermal load priority. FIG. 6 is a schematic diagram illustrating a map prescribing the relationship between the load (horizontal axis) on the motors 20 and 22 and the thermal load priority (vertical axis). As illustrated in FIG. 6, if the load on the motors 20 and 22 is a predetermined value P1 or less, the value of the thermal load priority is a value close to 0. If the load on the motors 20 and 22 exceeds the predetermined value P1, the value of the thermal load priority increases in association with the rise in the load.

In the following, a method of estimating the thermal load priority on the basis of information external to the vehicle obtained from the external world recognizer 200 will be described. The external world recognizer 200 is a component for recognizing the external environment. As one instance, the external world recognizer 200 is provided with a stereo camera. The stereo camera provided in the external world recognizer 200 captures the world outside the vehicle, and acquires image information about the world outside the vehicle, particularly image information about the road surface in front of the vehicle, lane lines indicating traffic lanes, the preceding vehicle, traffic signals, and various road signs and markings. The stereo camera includes a pair of left and right cameras including an image sensor such as a CCD sensor or a CMOS sensor, and acquires image information by capturing the external environment outside the vehicle.

The external world recognizer 200 is able to generate and acquire information about the distance to a target object (such as the preceding vehicle) by applying the principle of triangulation to the displacement between corresponding positions in a pair of left/right stereo images obtained by the pair of left/right cameras capturing the forward direction of the vehicle itself. In addition, the external world recognizer 200 is able to perform a commonly known grouping process on the distance information generated by the principle of triangulation, and by comparing the distance information subjected to the grouping process against preset three-dimensional object data or the like, detect object data, lane line data, and the like. With this arrangement, the external world recognizer 200 is also able to recognize lane lines indicating traffic lanes, stop signs, stop lines, ETC gates, and the like. The external world recognizer 200 may also be a component that recognizes the outside world by laser radar, a navigation system, and the like.

For instance, in the case in which the external world recognizer 200 determines that the vehicle 500 is climbing a hill, since the load on the motors 20 and 22 increases, the thermal load priority increases. Also, in the case in which the external world recognizer 200 determines that the vehicle 500 is traveling on a rough and bumpy road, since the load on the motors 20 and 22 increases, the thermal load priority increases.

Additionally, the navigation apparatus 300 is able to search for a route from the current location to a destination on the basis of map information. For this reason, the navigation apparatus 300 is able to acquire the current position of the vehicle by the Global Positioning System (GPS) or the like.

When the navigation apparatus 300 ascertains a route from the current location to the destination, if there are many hills along the route from the current location to the destination, the load on the motors 20 and 22 will increase correspondingly, and thus the thermal load priority increases. Similarly, if there are many rough roads along the route from the current location to the destination, the load on the motors 20 and 22 will increase correspondingly, and thus the thermal load priority increases.

The thermal load priority may be computed using any one of the techniques described above, or may be computed by combining the techniques described above and weighting each technique or the like. Also, the thermal load priority may be computed for each of the front-wheel motor 20 and the rear-wheel motor 22. By computing the thermal load priority for each of the motors 20 and 22, in the case in which the thermal load is predicted to rise for one of the motors 20 and 22, the front-rear distribution may be switched to a distribution that prioritizes stability.

The stability priority is an evaluation value (indicator) when controlling the motors 20 and 22 while prioritizing the stability of the vehicle 500. The stability priority increases in accordance with the occurrence of a slip of the vehicle 500 as described above. Also, the stability priority increases when the vehicle 500 skids, accelerates suddenly, brakes with the emergency brake, travels at high speed, or turns with a high G-force.

For instance, whether the vehicle 500 is skidding may be determined according to whether a target yaw rate computed by a known technique such as a planar two-wheeled model on the basis of the vehicle speed and the steering angle obtained from the steering angle sensor 35 is in agreement with an actual yaw rate computed from the yaw rate sensor 49. In the case in which the actual yaw rate is divergent from the target yaw rate, since it may be determined that the vehicle 500 is skidding, the stability priority increases.

Also, whether the vehicle 500 is accelerating suddenly may be determined on the basis of an acceleration obtained from the acceleration sensor 38 or an accelerator pedal position obtained from the accelerator pedal position sensor 32. In the case in which the vehicle 500 is accelerating suddenly, the stability priority increases.

Also, whether the vehicle 500 is braking with the emergency brake may be determined on the basis of an acceleration obtained from the acceleration sensor 38, or a brake pedal position obtained from the brake pedal position sensor 33. In the case in which the vehicle 500 is braking with the emergency brake, the stability priority increases.

Also, whether the vehicle 500 is traveling at high speed may be determined on the basis of a vehicle speed obtained from the wheel speed sensors 28, 30, 40, and 42. Also, whether the vehicle 500 is turning with a high G-force may be determined on the basis of a horizontal G-force obtained from the horizontal G-force sensor 48. In the case in which the vehicle 500 is traveling at high speed or turning with a high G-force, the stability priority increases.

The stability priority may be computed using any one of the techniques described above, or may be computed by combining the techniques described above and weighting each technique or the like.

The computation of the thermal load priority as above is executed by a thermal load priority calculator 102 of the controller 100, while the computation of the stability priority is executed by a stability priority calculator 104 of the controller 100.

FIG. 4 illustrates the change in the thermal load priority and the stability priority computed by techniques like the above. In the instance illustrated in FIG. 4, the stability priority rises as the wheel speed (vehicle speed) rises. As described above, the faster the vehicle 500 is traveling, the higher the stability priority increases. Also, the stability priority is increased between time t1 and time t2 during which a slip is determined to have occurred.

Also, as illustrated in FIG. 4, the thermal load priority rises as the motor temperature rises. As described above, the thermal load priority may be computed from the map illustrated in FIG. 5 that prescribes a relationship between the temperature of the motors 20 and 22 and the thermal load priority.

As front-rear distributions of the driving force illustrated in FIG. 4, a front-rear distribution prioritizing stability and a front-rear distribution prioritizing the thermal load are set. In the front-rear distribution prioritizing stability, the torque distribution of the front wheels is increased above that of the rear wheels (point A illustrated in FIG. 2). Also, in the front-rear distribution prioritizing the thermal load, as one instance, the torque distribution of the front wheels and the torque distribution of the rear wheels are equalized (point B illustrated in FIG. 2). Whether to set the front-rear distribution prioritizing stability or the front-rear distribution prioritizing the thermal load is decided according to the magnitudes of the stability priority and the thermal load priority. Additionally, the front-rear distribution prioritizing stability and the front-rear distribution prioritizing the thermal load may be changed according to the vehicle state.

In the instance illustrated in FIG. 4, before time t3, the thermal load priority is smaller than the stability priority, whereas after time t3, the stability priority is smaller than the thermal load priority. For this reason, as illustrated by the characteristics of the front-rear distribution in FIG. 4, before time t3, the motors 20 and 22 are driven according to the front-rear distribution prioritizing stability, whereas after time t3, the motors 20 and 22 are driven according to the front-rear distribution prioritizing the thermal load. In other words, in the case in which the thermal load priority becomes greater than the stability priority, the front-rear distribution is switched from the front-rear distribution prioritizing stability to the front-rear distribution prioritizing the thermal load. The control of the front-rear driving force distribution in accordance with the thermal load priority and the stability priority is executed by a driving force distribution controller 106 of the controller 100.

Figure 7:
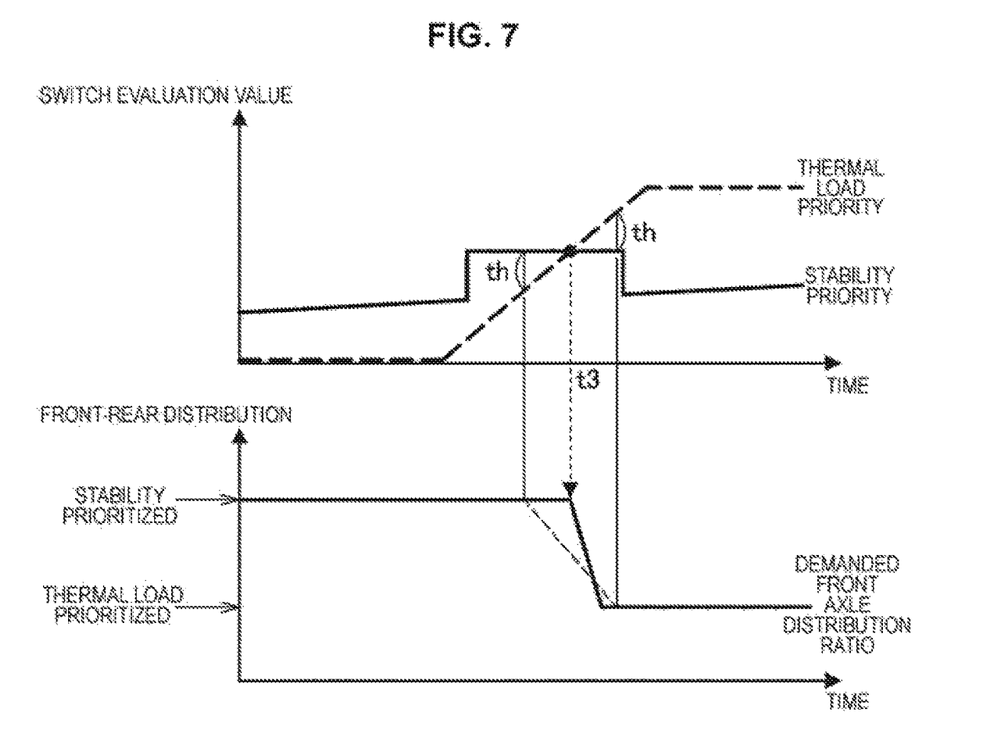
FIG. 7 is a schematic diagram illustrating an instance of smoothly varying the ratio of a front-rear distribution according to the magnitude of the difference between a thermal load priority and a stability priority.

Note that in FIG. 4, the distribution is switched from the front-rear distribution prioritizing stability to the front-rear distribution prioritizing the thermal load in a stepwise manner at the point when time t3 is reached, but the ratio of the front-rear distribution may also be varied smoothly according to the magnitude of the difference between the thermal load priority and the stability priority. FIG. 7 is a schematic diagram illustrating an instance of smoothly varying the ratio of the front-rear distribution according to the magnitude of the difference between the thermal load priority and the stability priority. In the instance illustrated in FIG. 7, at the point in time when the absolute value of the difference between the thermal load priority and the stability priority becomes less than a predetermined value th, the ratio of the front-rear distribution begins to change from the front-rear distribution prioritizing stability to the front-rear distribution prioritizing the thermal load. Additionally, when the difference between the thermal load priority and the stability priority reaches 0, and the absolute value of the difference reaches the predetermined value th again, the ratio of the front-rear distribution reaches the front-rear distribution prioritizing thermal load. When switching between the front-rear distribution prioritizing stability and the front-rear distribution prioritizing the thermal load, as the difference between the thermal load priority and the stability priority becomes larger, the front-rear distribution is made to transition from one front-rear distribution towards the other front-rear distribution.

Figure 8:
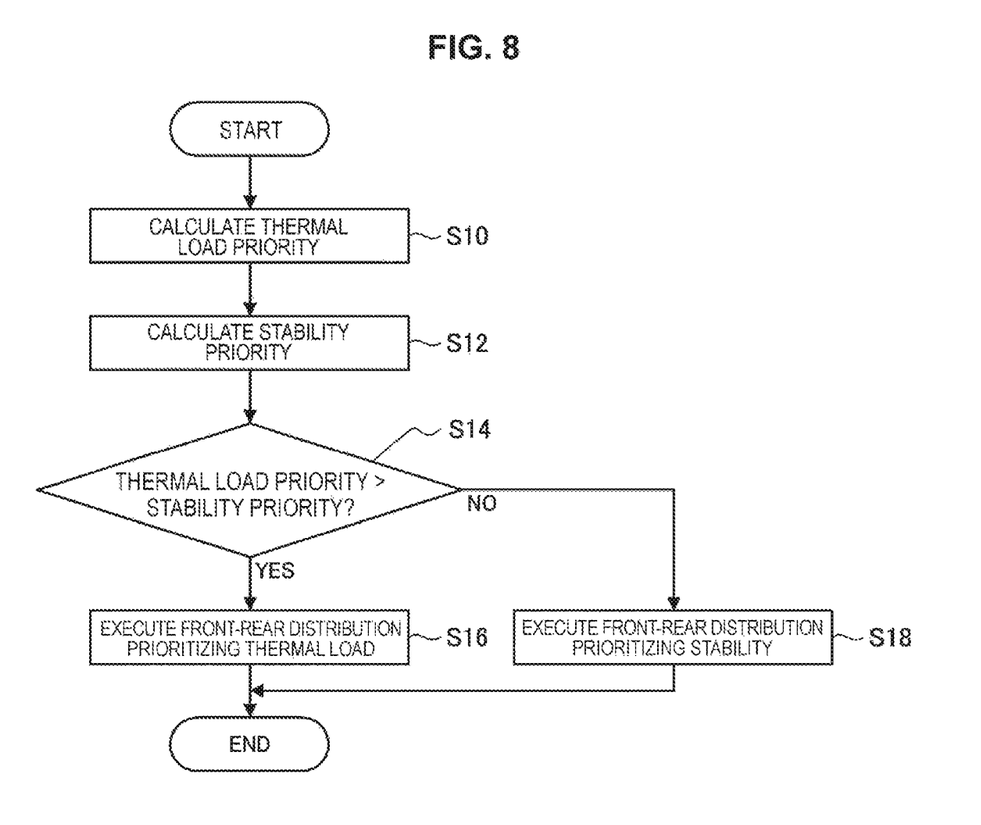
FIG. 8 is a flowchart illustrating a sequence of processes in a control apparatus of the example.

Next, a processing sequence in the controller 100 of the example will be described on the basis of the flowchart in FIG. 8. First, in step S10, the thermal load priority calculator 102 calculates the thermal load priority. Next, in step S12, the stability priority calculator 104 calculates the stability priority.

In the next step S14, the driving force distribution controller 106 compares the thermal load priority and the stability priority, and determines whether the thermal load priority is greater than the stability priority. Subsequently, in the case in which the thermal load priority is greater than the stability priority, the process proceeds to step S16. In step S16, the driving force distribution controller 106 controls the motors 20 and 22 according to the front-rear distribution prioritizing the thermal load.

On the other hand, in the case in which the thermal load priority is less than or equal to the stability priority, the process proceeds to step S18. In step S18, the driving force distribution controller 106 controls the motors 20 and 22 according to the front-rear distribution prioritizing stability. After step S16 or S18, the process ends (END).

As described above, according to the example, the thermal load priority and the stability priority are calculated, and on the basis of a result of comparing the thermal load priority and the stability priority, the distribution of driving force is switched between a front-rear distribution prioritizing the thermal load and a front-rear distribution prioritizing stability. Consequently, it becomes possible to drive the motors 20 and 22 optimally.

Although the preferred examples of the present invention have been described in detail with reference to the appended drawings, the present invention is not limited thereto. It is obvious to those skilled in the art that various modifications or variations are possible insofar as they are within the technical scope of the appended claims or the equivalents thereof. It should be understood that such modifications or variations are also within the technical scope of the present invention.

The invention claimed is:

1. A vehicle control apparatus comprising:
   a thermal load priority calculator configured to calculate a thermal load priority that prioritizes a thermal load of a motor for driving a vehicle according to an operating state of the vehicle;
   a stability priority calculator configured to calculate a stability priority that prioritizes a stability of the vehicle according to an operating state of the vehicle; and
   a driving force distribution controller configured to control a driving force distribution in a front and a rear of the vehicle, on a basis of a result of comparing the thermal load priority and the stability priority.

2. The vehicle control apparatus according to claim 1, wherein
   the driving force distribution controller controls the driving force distribution on a basis of a difference between the thermal load priority and the stability priority.

3. The vehicle control apparatus according to claim 1, wherein
   the driving force distribution controller controls the driving force distribution prioritizing the thermal load of the motor in a case in which the thermal load priority is greater than the stability priority, and controls the driving force distribution prioritizing the stability of the vehicle in a case in which the thermal load priority is less than or equal to the stability priority.

4. The vehicle control apparatus according to claim 1, wherein
   the thermal load priority calculator calculates the thermal load priority on a basis of a temperature of the motor, such that as the temperature rises, the thermal load priority becomes larger.

5. The vehicle control apparatus according to claim 1, wherein
   the thermal load priority calculator calculates the thermal load priority on a basis of a load imposed on the motor, such that as the load increases, the thermal load priority becomes larger.

6. The vehicle control apparatus according to claim 1, wherein
   the thermal load priority calculator calculates the thermal load priority on a basis of a vehicle outside environment captured by a camera.

7. The vehicle control apparatus according to claim 1, wherein
   the thermal load priority calculator calculates the thermal load priority on a basis of a piece of information about a route on which the vehicle travels, the route being obtained from a navigation system.

8. The vehicle control apparatus according to claim 1, wherein
   the stability priority calculator calculates the stability priority on a basis of a result of a wheel slip determination, such that if a slip is determined, the stability priority becomes larger.

9. The vehicle control apparatus according to claim 1, wherein
   the stability priority calculator calculates the stability priority on a basis of whether the vehicle is skidding, such that if the vehicle is skidding, the stability priority becomes larger.

10. The vehicle control apparatus according to claim 1, wherein
    the stability priority calculator calculates the stability priority according to whether the vehicle is accelerating or decelerating suddenly, such that if the vehicle is accelerating or decelerating suddenly, the stability priority becomes larger.

11. The vehicle control apparatus according to claim 1, wherein
    the stability priority calculator calculates the stability priority according to a vehicle speed of the vehicle, such that as the vehicle speed increases, the stability priority becomes larger.

12. The vehicle control apparatus according to claim 1, wherein
    the stability priority calculator calculates the stability priority according to an acceleration in a horizontal direction of the vehicle, such that as the acceleration in the horizontal direction increases, the stability priority becomes larger.

13. A vehicle control method comprising:
    calculating a thermal load priority that prioritizes a thermal load of a motor for driving a vehicle according to an operating state of the vehicle;
    calculating a stability priority that prioritizes a stability of the vehicle according to an operating state of the vehicle; and
    controlling a driving force distribution in a front and a rear of the vehicle, on a basis of a result of comparing the thermal load priority and the stability priority.

14. A vehicle control apparatus comprising:
    circuitry configured to calculate a thermal load priority that prioritizes a thermal load of a motor for driving a vehicle according to an operating state of the vehicle, calculate a stability priority that prioritizes a stability of the vehicle according to an operating state of the vehicle, and control a driving force distribution in a front and a rear of the vehicle, on a basis of a result of comparing the thermal load priority and the stability priority.

* * * * *